United States Patent [19]

Carlson et al.

[11] Patent Number: 5,211,212
[45] Date of Patent: May 18, 1993

[54] CUTTING TOOTH

[75] Inventors: Bertyl W. Carlson, Richfield; Ronald W. Wiemeri, Owatonna, both of Minn.

[73] Assignee: Blount, Inc., Montgomery, Ala.

[21] Appl. No.: 890,923

[22] Filed: May 29, 1992

[51] Int. Cl.⁵ .................. A01G 23/08; B27G 13/00
[52] U.S. Cl. .................. 144/241; 30/379.5; 83/839; 83/840; 83/853; 83/855; 83/698; 83/928; 144/3 D; 144/34 R; 144/336; 467/48
[58] Field of Search .............. 83/839, 840, 853, 855, 83/698, 928; 30/379.5; 407/34, 40, 48, 113; 144/3 D, 34 R, 241, 335, 336

[56] References Cited

U.S. PATENT DOCUMENTS

| | | |
|---|---|---|
| 2,746,494 | 5/1956 | Cox . |
| 2,958,348 | 3/1959 | Bueneman . |
| 2,978,000 | 6/1959 | Raney . |
| 3,213,716 | 10/1965 | Getts . |
| 4,164,329 | 8/1979 | Higby . |
| 4,222,298 | 9/1980 | James . |
| 4,627,322 | 12/1986 | Hayhurst, Jr. . |
| 4,738,291 | 4/1988 | Isley ................... 144/34 R |
| 4,744,148 | 5/1988 | Brown . |
| 4,750,396 | 6/1988 | Gaddis et al. .......... 83/840 |
| 4,770,219 | 9/1988 | Blackwell, Jr. .......... 407/48 |
| 4,782,731 | 11/1988 | Huntington . |
| 4,813,325 | 3/1989 | Gelman . |
| 4,881,438 | 11/1989 | Pinney . |
| 4,922,791 | 5/1990 | Pinney . |
| 4,932,447 | 6/1990 | Morin ................. 144/34 R |
| 4,989,489 | 2/1991 | Pinney . |
| 5,058,477 | 10/1991 | MacLennan . |
| 5,085,112 | 2/1992 | MacLennan . |
| 5,088,371 | 2/1992 | MacLennan .......... 83/840 |
| 5,103,882 | 5/1992 | Milbourn ............. 144/34 R |
| 5,131,305 | 7/1992 | MacLennan .......... 83/840 |

FOREIGN PATENT DOCUMENTS 1269028 5/1990 Canada .

Primary Examiner—W. Donald Bray

[57] ABSTRACT

A cutting tooth for a tree felling saw having a concave front surface and a convex rear surface can be removably fixed to a saw by a fastening device The front surface and the rear surface are uniformly spaced and have a plurality of side surfaces extending therebetween. The intersection of each side section with the front surface forms a cutting edge. An aperture is formed in the cutting tooth for receiving the mounting element.

14 Claims, 3 Drawing Sheets

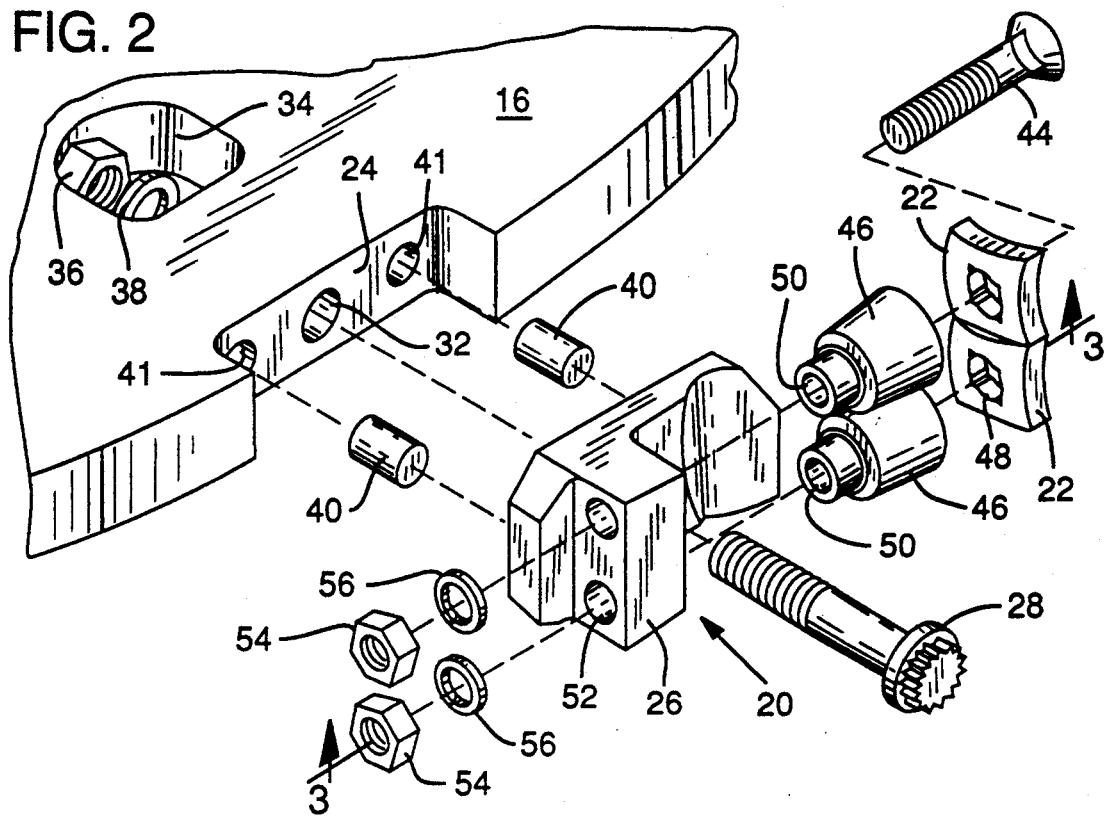
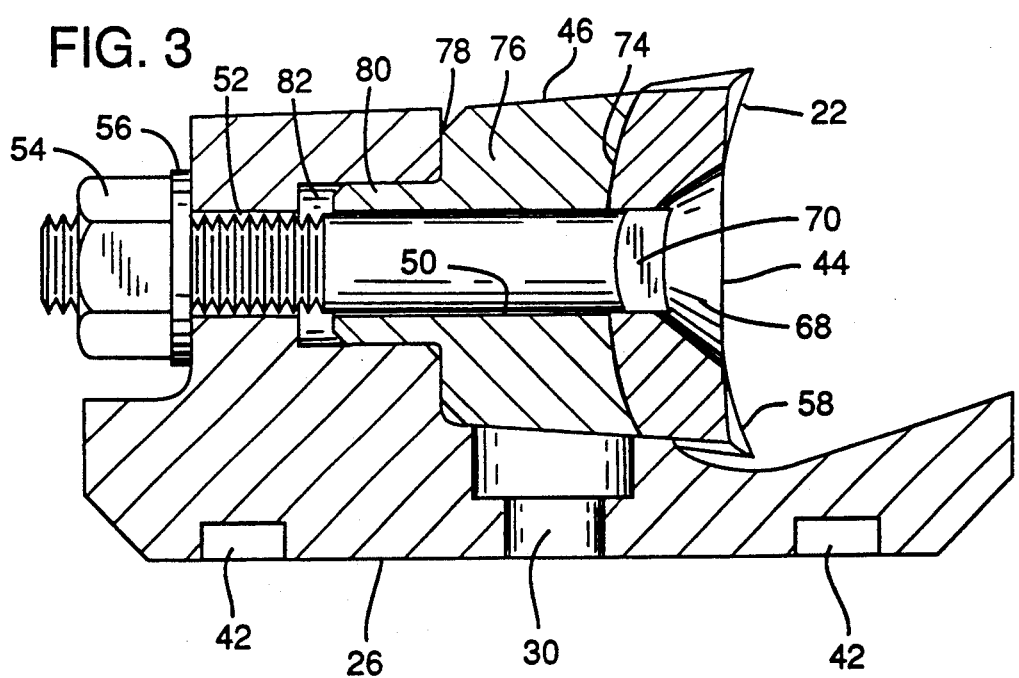

CUTTING TOOTH

BACKGROUND OF THE INVENTION

1. Field of the Invention

The present invention relates to a cutting tooth, and more particularly, to a replaceable cutting tooth which can be removably attached to a cutting device such as a saw.

2. Description of Related Art

Tree fellers have become widely accepted as providing a fast and efficient means for harvesting trees. Such fellers typically include a mobile unit carrying a feller head. In operation, the mobile unit is driven up to a tree to be felled and the feller head moved into position adjacent the tree. Arms provided on the feller head grip the tree to support it during the felling operation. The base of the feller head is provided with a spinning disc saw which severs the tree. The feller head then supports the severed tree as it is transported to a new location for further operations, such as delimbing.

To maximize the amount of lumber available from each tree, it is desirable to sever the tree as cleanly as possible to avoid damage to nearby wood. In addition, it is desirable to sever the tree as near the ground as possible. These two goals are not always easily achieved. Sharp, undamaged saw teeth are important to cleanly sever the tree. However, in the process of maneuvering the feller saw to sever the tree as close to the ground as possible, it is not uncommon for the saw to inadvertently contact soil, boulders, and other low lying obstacles. Contact with soil and the like can be very abrasive and rapidly dull the saw teeth. In addition, contact of the spinning saw with boulders and small rocks can result in shock loads and other forces which break, chip, or dull the saw teeth. Such shock loads are particularly devastating to teeth made of brittle materials, such as carbide, which tend to shatter or crack.

Given the adverse conditions that the saws on feller heads are subject to, it is desirable that the saw teeth be durable, be able to withstand shock loads, and be easily and inexpensively replaceable when damaged or worn. A variety of saw teeth have been developed in an effort to meet these needs. For example, U.S. Pat. No. 4,738,291 to Isley shows a machined, circular cutting tooth which is attached to a tooth mount by a socket head bolt and nut. However, because this tooth is machined, it requires a great deal of labor to manufacture and, hence, is relatively expensive to produce. Further, the circular cutting edge is inefficient and the position of the socket head on the face of the tooth causes the socket to wear. Such wear can make removal and replacement of this type of tooth difficult.

Another tooth, shown in U.S. Pat. No. 4,932,447 to Morin, is square with a concave front cutting surface and a flat rear surface. An integral shaft extends from the rear surface allowing the tooth to be fixed to a saw. Similar, teeth are shown in U.S. Pat. Nos. 5,058,477, 5,085,112, and 5,088,371 to MacLennan. All of these teeth have an integral mounting shaft extending from the rear of the cutting tooth. As a result of this relatively complex shape, these types of teeth typically require a substantial amount of machining during the manufacturing process. The need for this labor intensive manufacturing technique makes such teeth relatively expensive. In addition, each time the tooth is replaced due to wear or damage, the mounting shaft must, inherently, also be replaced. The increased material necessary to make the mounting shaft further contributes to the expense of such teeth.

SUMMARY OF THE INVENTION

Accordingly, it is an object of the present invention to provide a cutting tooth that is durable, efficient, and capable of withstanding shock loads.

It is another object of the invention to provide a cutting tooth that can be quickly and easily replaced when damaged or worn.

It is a further object of the invention to provide a cutting tooth that is easily and inexpensively manufactured.

A cutting tooth in accordance with one aspect of the present invention has a concave front surface, a convex rear surface uniformly spaced from the front surface, and side surfaces extending from the front surface to the rear surface. The intersection of each side surface with the front surface defines a cutting edge. The cutting tooth can be removably attached to a saw by a mounting element, such as a bolt, received in an aperture formed in the cutting tooth.

A cutting tooth in accordance with another aspect of the invention is punched from a flat piece of metal and stamped to form a concave front surface and a convex rear surface.

Other objects and aspects of the invention will become apparent to those skilled in the art from the detailed description of the invention which is presented by way of example and not as a limitation of the present invention.

BRIEF DESCRIPTION OF THE DRAWINGS

FIG. 2 is a partial, exploded view of a section of the saw illustrated in FIG. 1 showing a tooth mounting assembly having a pair of cutting teeth in accordance with a preferred embodiment of the present invention.

FIG. 3 is an enlarged cross sectional view of an assembled cutting tooth and mounting assembly taken along line 3—3 of FIG. 2.

DESCRIPTION OF THE ILLUSTRATED EMBODIMENT

Figure 1:
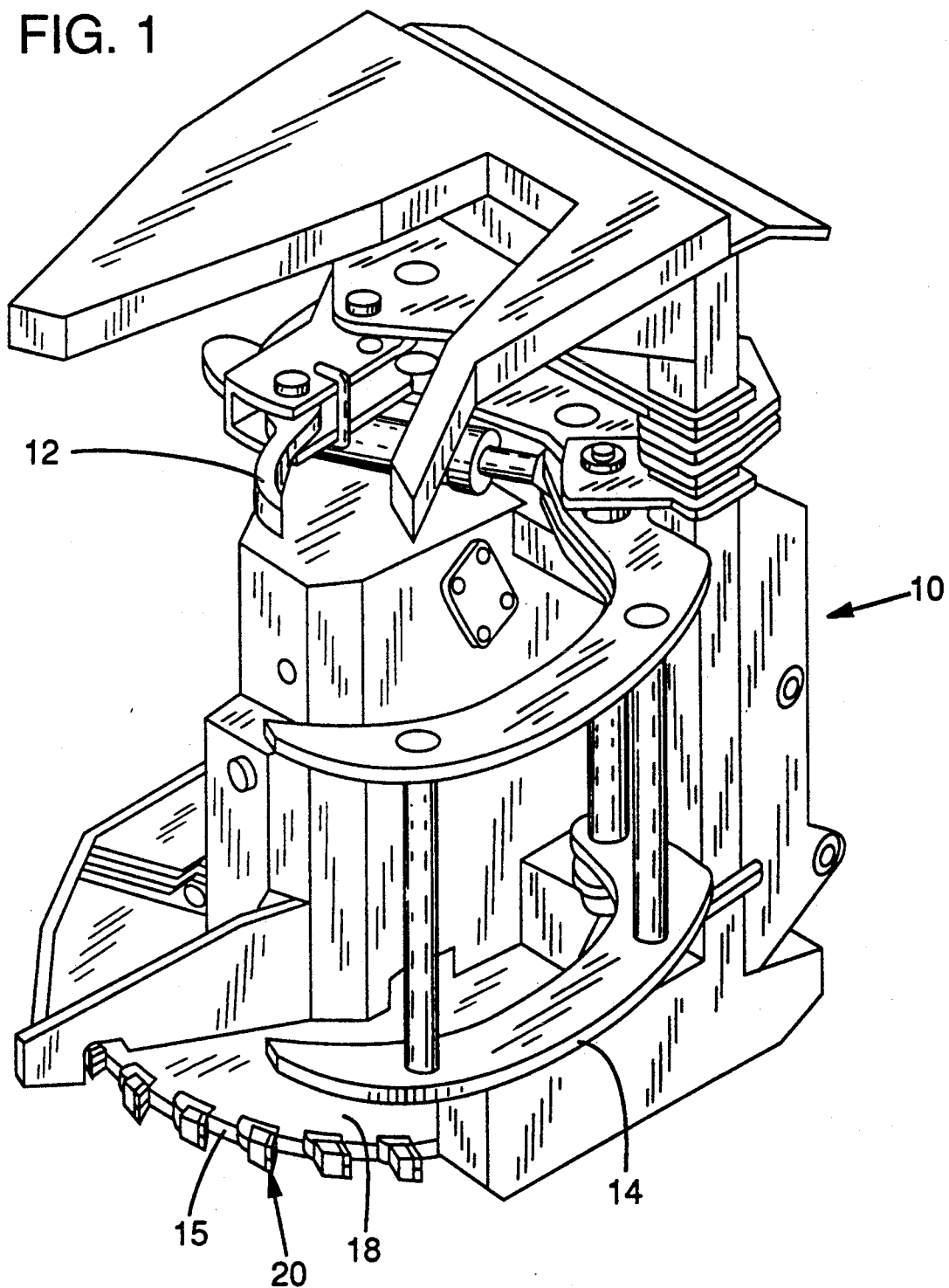
FIG. 1 illustrates a tree feller head having a saw provided with cutting teeth in accordance with a preferred embodiment of the present invention.

A typical feller head 10 is illustrated in FIG. 1. The feller head 10 is typically attached to a mobile unit (not shown) which allows the feller head to be moved into position adjacent a tree to be felled. The feller head 10 is provided with a bunching arm 12 and a gathering arm 14 which grasp the tree to be felled. A spinning disc saw 15 at the lower end of the feller head 10 severs the gripped tree as the feller head 10 is advanced toward the tree. After the tree is severed, it is supported on the supporting surface 18 of the feller head 10 as it is transported for further operations.

With reference to FIG. 2, the disc saw 15 comprises a disc 16 to the periphery of which are secured in plurality of tooth mounting assemblies 20 each holding a pair of cutting teeth 22 in accordance with a preferred embodiment of the present invention. In the illustrated embodiment, the disc 16 is provided with a number of tooth mounting gullets 24 formed in its peripheral edge. Each gullet is configured to receive a tooth mounting assembly 20 which, in turn, fixes the cutting teeth 22 in position relative to the disc saw 16. In this manner, a number of cutting teeth are distributed around the periphery of the saw to allow the saw to cleanly and efficiently sever the tree.

In the embodiment of FIG. 2, the mounting assembly 20 includes a mounting block 26 fixed to the saw disc 16 by a holding bolt 28. The holding bolt 28 passes through an aperture 30 (seen in FIG. 3) formed in the mounting block 26, through a bore 32 formed in the disc 16, and terminates in an opening 34 associated with the gullet 24. A nut 36 and locking washer 38 are threaded onto the holding bolt 28 to fix the mounting block within the gullet 24. A holding pin 40 is provided near each end of the mounting block 26. The holding pins are received in apertures 41 in the disc and apertures 42 in the mounting block 26 and engage both the disc 16 and the mounting block 26 to help resist shear forces applied to the holding bolt 28 and to prevent the mounting block 26 from rotating about the holding bolt 28.

As best seen in FIGS. 2 and 3, each cutting tooth 22 is removably fixed to the mounting block 26 by one of a pair of mounting bolts 44. In other embodiments, fastening devices other than a bolt could be used. Each tooth is mounted similarly and the mounting of only one will be described in detail. As shown in FIGS. 2 and 3, an adapter 46 is interposed between the cutting tooth 22 and the mounting block 26. A mounting bolt 44 passes through an aperture 42 in the cutting tooth, through a central bore 50 in the adapter, and through a hole 52 in the mounting block 26. A nut 54 with a locking washer 56 is threaded onto the mounting bolt 44 to removably fix the cutting tooth 22 to the mounting block. In this manner, the nut 54 can be easily removed to allow replacement, repair, or rotation of the cutting teeth 22. The adapter 46 and the mounting bolt 44 can be reused. Thus, the cutting teeth 22 can be replaced when worn without the need to replace or discard unworn elements of the mounting assembly.

Figure 4:
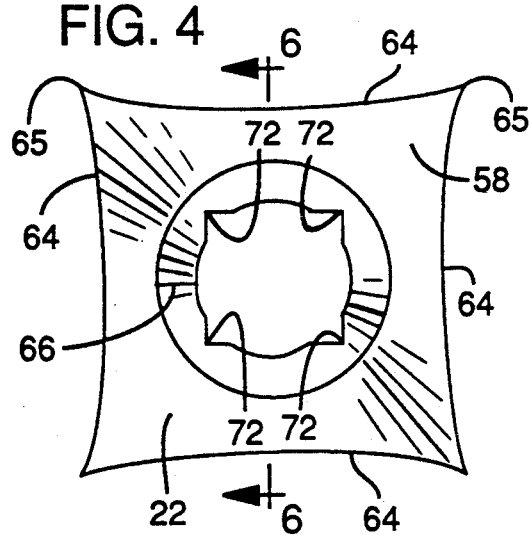
FIG. 4 is a front view of a cutting tooth in accordance with a preferred embodiment of the present invention.
Figure 5:
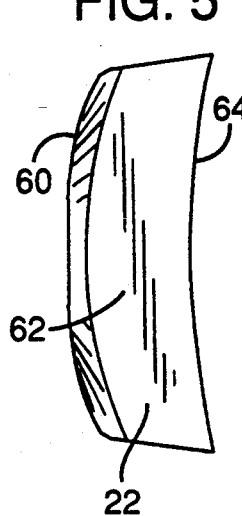
FIG. 5 is a side view of the cutting tooth of FIG. 4.
Figure 6:
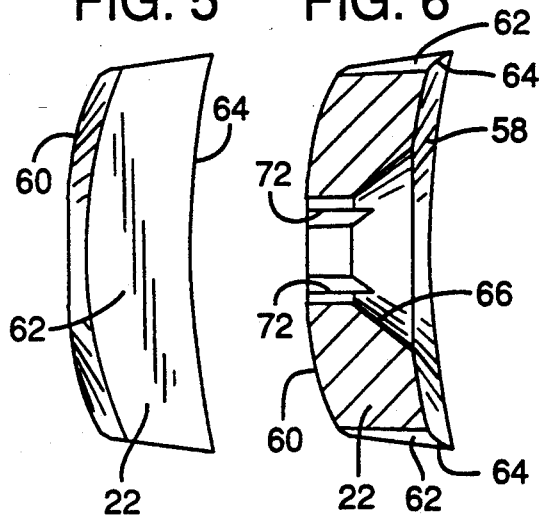
FIG. 6 is a cross section of the cutting tooth of FIG. 4 taken along line 6—6 of FIG. 4.

In the illustrated embodiment, the cutting tooth 22 has a concave front surface 58 and a convex rear surface 60. As illustrated in FIGS. 4-6, the curvatures of the front surface 58 and the rear surface 60 are generally spherical. It is believed that this curvature provides an effective surface for directing wood chips and saw dust during cutting operations. However, other curvatures, such as frustoconical, trapezoidal, and the like may also be used. The cutting tooth 22 has a generally uniform thickness. As discussed below, this allows the illustrated cutting tooth to be easily and efficiently manufactured by stamping and forming a flat piece of material.

The illustrated cutting tooth 22 is generally square in shape and has four side walls 62 extending from the front surface 58 to the rear surface 60. The intersection of each side wall 62 with the front surface 58 forms cutting edge 64. As seen in FIG. 4, each side wall 62 is slightly concave. This results in a configuration in which each cutting edge 64 is slightly curved with the ends of the cutting edges, i.e., the corners 65 of the cutting tooth, being the most prominent. In this manner, as the cutting tooth is moved through the wood, each corner 65 severs the wood fibers at each side of the cutting tooth and the remainder of the cutting edge removes the severed fibers. This results in a very efficient cutting action.

As seen best in FIGS. 5 and 6, each side wall 62 slopes slightly inward as it extends from the front surface 58 to the rear surface 60. This slope, which is approximately six degrees in the illustrated embodiment, produces an efficient cutting edge and provides clearance between the rear of the cutting tooth and the material being cut.

The aperture 42 for the mounting bolt 44 is provided with a countersink 66 at the front surface 58 of the cutting tooth 22. The countersink 66 is shaped such that the head 68 of mounting bolt 44 is generally flush with the front surface 58 of the cutting tooth. This reduces wear to the bolt head. In addition, this configuration does not impede the movement of chips and saw dust across the front surface of the tooth and results in a cleaner, more efficient cutting action.

In the illustrated embodiment, the mounting bolt head 68 is generally frustoconical, that is a conic projection, with a square section 70 adjacent the bolt shank. The aperture 42 generally circular but is provided with four corners 72 sized and positioned such that they each engage a corner of the square section 70 of the mounting bolt head 68 when the mounting bolt 44 is received in the aperture. When so engaged, the mounting bolt is prevented from rotating relative to the cutting tooth. As a result, it is not necessary to provide a socket, or other means, to grip the bolt when tightening and loosening nut 54. This is advantageous because such sockets are prone to wear making it difficult grip the mounting bolt to remove the cutting tooth.

In the illustrated embodiment, the cutting tooth 22 is particularly well suited for simple and easy manufacture from a flat metal plate. The plate can be punched or drilled to form the aperture 48 and machined to form the countersink 66. A single punching or shearing operation can form a blank having the generally square shape of the cutting tooth and form the corners 72 in the aperture. It has been found that the edge formed by the punching or shearing process is adequate for cutting. Thus, in the illustrated embodiment, it is unnecessary to remove the flash from the punching or shearing operation, sharpen the edge, or otherwise prepare the edge of the blank. Of course, there may be other embodiments where further edge treatment may be desirable.

The square blank can be stamped to form the curvature of the front surface 58 and the rear surface 60. In the illustrated embodiment, it has been found that a series of three stamping operations, each producing a progressively smaller radius of curvature, has been found to be satisfactory. The stamping operation can also be used to form the clearance angle of the inwardly sloping side walls. It has been found desirable to heat the blank during the stamping process. In some applications heat treating the formed cutting tooth may be desirable.

This process which relies largely on inexpensive punching and stamping operations is much more efficient and inexpensive than machining. Those skilled in the art will appreciate that the exact sequence and process used to manufacture the tooth will vary depending on the particular dimensions of the desired cutting tooth, the material used to form the tooth, and the intended use of the tooth.

In the illustrated embodiment, the tooth was formed from a plate of one quarter inch alloyed high-carbon steel annealed (4340). This material is less brittle than many common tooth forming materials, such as carbide. As a result, a tooth made from this material is better able to withstand the shock loads produced by impacts with boulders and the like. Accordingly, a cutting tooth made of this material is ideal for use on felling equipment operated in rocky environments. However, other materials might also be used to produce a cutting tooth in accordance with the present invention.

Although the exact dimensions of the cutting tooth 22 can vary widely depending on the particular saw and use for which the tooth is intended, the illustrated embodiment is approximately 1.156 inches square. The front surface has a radius of curvature of 1.171 inches and the rear surface has a radius of curvature of approximately 1.421 inches. The difference between the front and rear radiuses contributes to formation of the clearance angle of approximately six degrees. The cutting edges 64 are a compound curvature radii of a frontal radius of approximately 1.75 inches and a side radius of approximately 2.82 radius. These radii result in the corners 65 of the cutting tooth forming included angles of approximately 73 degrees.

In the embodiment of FIGS. 2 and 3, an adapter 46 is used to provide support for a cutting tooth 22 and to position the cutting tooth on the mounting block 26. The adapter face 74 is shaped to form a seat for receiving the rear surface 60 of the cutting tooth. In the illustrated embodiment, the face 74 is concave and has a radius of curvature substantially equal to the radius of curvature of the rear surface 60. The body 76 of the adapter 46 is generally frustoconical, or a conic projection. The adapter is provided with a shoulder 78 which abuts the mounting block 26 and a neck 80 which is received in a seat 82 formed in the mounting block. The shoulder and neck of the adapter are sized to abut and fit snugly with the seat of the mounting block to ensure a solid and stable mount for the cutting tooth.

The adapter is provided with a bore 50 extending along its length. A hole 52 is provided in the mounting block at the base of the seat 82. In this manner, the mounting bolt can be passed through the aperture 48 in the cutting tooth 22, the bore 50 in the adapter 46, and the hole 52 in the mounting block 26 and nut 54 threaded thereon to firmly attach the cutting tooth to the mounting block. As explained above, the corners 72 engage the square section 70 of the mounting bolt to prevent the bolt from rotating. When the cutting tooth is positioned on the mounting block, contact between the cutting tooth and the mounting bock prevents the cutting tooth from rotating. Thus, the nut 54 can be easily loosened and tightened without the need for special tools to prevent the bolt from rotating.

In the illustrated embodiment, the aperture 48 is centrally disposed in the cutting tooth 22. As a result, the cutting tooth can be positioned on the mounting block with any of the four cutting edges at the top. As can be readily appreciated, the top cutting edge does most of the cutting and is most subject to wear during the cutting operation. With the configuration of the preferred embodiment, it is possible to rotate the cutting tooth when the top cutting edge becomes worn to position a new cutting edge in the top position. In this manner, the cutting tooth of the illustrated embodiment can be rotated four times to place a new cutting edge in the top position. The ability to selectively use all four cutting edges dramatically extends the usable life of the cutting tooth.

The mounting block 26 illustrated in FIG. 2 is adapted to mount two cutting teeth in a single gullet. The configuration of the mounting block 26 allows the two cutting teeth to be arranged in a variety of different configurations. For example, in FIG. 2, two cutting teeth 22 are used, each being mounted on an adapter 46.

Figure 7:
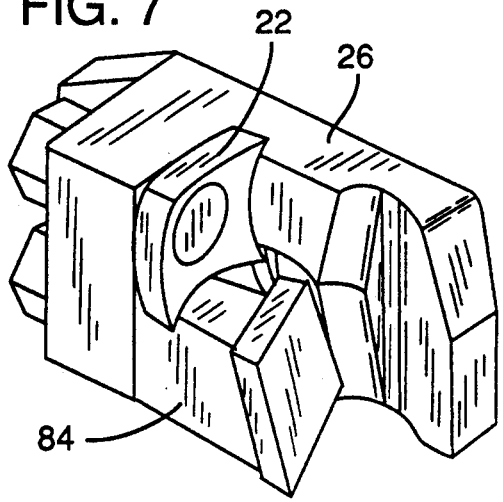
FIG. 7 is a perspective view of a tooth mounting assembly ,having a cutting tooth in accordance with a preferred embodiment of the invention.

In another configuration, shown in FIG. 7, a single cutting tooth 22 is mounted without an adapter 46 directly to the mounting block 26. A carbide cutting tooth 84 of a type known to those skilled in the art is mounted to the tooth mount adjacent the cutting tooth 22. In this configuration, the carbide tooth 84 does most of the cutting. The cutting tooth 22 serves largely to clean the kerf and protect the mounting block seat 82 (FIG. 3) from wear caused by the chips and saw dust removed from the kerf. The staggered heights of the cutting teeth 22, 84 in the configuration of FIG. 7 also provides additional room in front of the cutting tooth 22 for the removed chips and sawdust to collect. This helps to reduce the undesirable tendency of the removed material to collect and compact in front of the carbide tooth 84.

Figure 8:
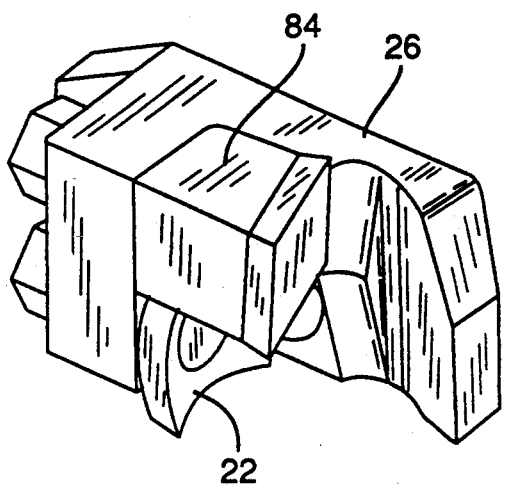
FIG. 8 is an alternative configuration of the tooth mounting assembly of FIG. 7.

The configuration of FIG. 7 has the cutting tooth 22 in the top position on mounting block 26. In FIG. 8, the cutting tooth 22 is in the bottom position. Ideally, these two configurations should be used together in a staggered configuration. That is, every second gullet of the saw should have the configuration of FIG. 7 and the remaining gullets should have the configuration of FIG. 8. This results in a saw tooth configuration which cuts efficiently and evenly. In addition, this particular configuration has proven ideal for use on rocky terrain.

Figure 9:
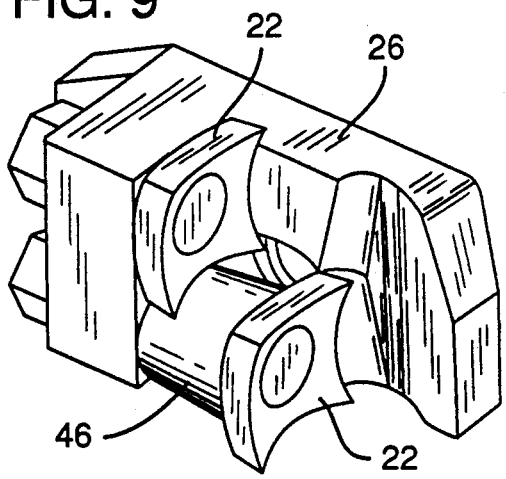
FIG. 9 is another alternative configuration of the tooth mounting assembly of FIG. 7.

As seen in FIG. 9, two cutting teeth 22 can also be used in staggered height configuration. Although the illustrated embodiment shows a mounting assembly for two cutting teeth, the cutting tooth 22 can also be installed in a mounting assembly designed to receive only a single tooth.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

What is claimed is:

1. A cutting tooth for removable attachment to a saw comprising:
   a concave front surface;
   a convex rear surface uniformly spaced form said front surface, the curvature of said rear surface corresponding with the curvature of said front surface to define a tooth having a uniform thickness; and
   a plurality of side surfaces, each side surface extending form the front surface to the rear surface,
   the intersection of each of the side surfaces with the front surface defining a cutting edge,
   the cutting tooth defines an aperture extending from the front surface to the rear surface for receiving a fastening device to removably attach the tooth to the cutting device.

2. The tooth of claim 1 wherein the number of side surfaces is four.

3. The tooth of claim 1 wherein the aperture is centrally located such that the tooth can be rotated about the mounting aperture to allow uniform wear of the cutting edges.

4. The tooth of claim 1 wherein the tooth is formed by shaping a flat plate of material having a uniform thickness.

5. The tooth of claim 4 wherein the material is steel.

6. A cutting tooth assembly for removably attaching a replaceable tooth to a tooth mount of a tree cutting device:
   a cutting tooth having a concave front surface, a convex rear surface, and a plurality of side surfaces connecting the front and rear surfaces, the curvature of the front surface corresponding with the curvature of the rear surface to define a cutting tooth having a uniform thickness, the cutting tooth defining a centrally located aperture which extends through the tooth from the front surface to the rear surface; and
   a fastening device removably received in the aperture for removably attaching the cutting tooth to the tooth mount of the tree cutting device.

7. The cutting tooth assembly of claim 6 wherein the number of side surfaces is four.

8. The cutting tooth of claim 6 further comprising an adapter with a first end having a concave shape configured complementary to receive the rear surface of the cutting tooth, and a second end configured to be received by the tooth mount, the adapter being provided with an aperture extending from the first end to the second end such that the adapter can be positioned to receive the rear surface of the cutting tooth and the mounting element can be passed through the aperture in the cutting tooth and the aperture in the adapter to attach the cutting tooth and adapter to the tooth mount of the cutting device.

9. A cutting tooth assembly for a saw comprising;
   a tooth mount attached to the saw, the tooth mount being provided with a recessed seat and defining a bore originating at the seat;
   an adapter having a first end being concave in shape and a second end configured to be received by the sea, the adapter defining an aperture extending from the first end to the second end;
   a cutting tooth having a concave front surface and a convex rear surface, the curvature of the front surface corresponding with the curvature of the rear surface to define a cutting tooth in which the distance between the front surface and the rear surface is uniform, the cutting tooth defining an aperture extending form the front surface to the rear surface, the cutting tooth being positioned adjacent the adapter with the rear surface being received by the first end; and
   a fastening device extending through the aperture in the cutting tooth, through the aperture in the adapter, and into the bore of the tooth mount to removably attach the cutting tooth to the saw.

10. The cutting tooth assembly of claim 9 wherein the cutting tooth has a plurality of side surfaces, each side surface extending from the front surface to the rear surface, the intersection between each side surface and the front surface forming a cutting edge.

11. The cutting tooth of claim 10 wherein there are four side surfaces.

12. The cutting tooth of claim 10 wherein the intersection between each side surface and the front surface forms an acute angle.

13. The cutting tooth of claim 12 wherein the aperture in the cutting tooth is centrally disposed such that the cutting tooth can be rotated to selectively position the cutting edges in various positions.

14. The cutting tool of claim 13 wherein each side surface slopes inward form the associated cutting edge toward the aperture i the cutting tooth at an angle of about six degrees.

* * * * *